(12) United States Patent
Sundstrom et al.

(10) Patent No.: US 7,853,100 B2
(45) Date of Patent: Dec. 14, 2010

(54) METHOD AND SYSTEM FOR PHOTO PLANNING AND TRACKING

(75) Inventors: Robert Sundstrom, Carey, NC (US); Scott Bardsley, Durham, NC (US); Mona Singh, Cary, NC (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 1136 days.

(21) Appl. No.: 11/463,295

(22) Filed: Aug. 8, 2006

(65) Prior Publication Data

US 2008/0037826 A1    Feb. 14, 2008

(51) Int. Cl.
*G06K 9/03* (2006.01)
(52) U.S. Cl. .................. 382/311; 715/710; 715/772; 360/31
(58) Field of Classification Search .................. 382/311
See application file for complete search history.

(56) References Cited

U.S. PATENT DOCUMENTS

| | | | |
|---|---|---|---|
| 5,740,801 A * | 4/1998 | Branson | 600/407 |
| 6,223,190 B1 * | 4/2001 | Aihara et al. | 715/234 |
| 6,516,154 B1 | 2/2003 | Parulski et al. | |
| 6,526,234 B1 | 2/2003 | Desormeaux | |
| 2001/0048815 A1 | 12/2001 | Nakajima et al. | |
| 2004/0150715 A1 | 8/2004 | Wilcock et al. | |
| 2004/0174434 A1 * | 9/2004 | Walker et al. | 348/211.3 |
| 2004/0175169 A1 | 9/2004 | Azuma et al. | |
| 2004/0260782 A1 | 12/2004 | Affleck et al. | |
| 2005/0172147 A1 | 8/2005 | Edwards et al. | |
| 2005/0228683 A1 | 10/2005 | Saylor et al. | |
| 2005/0278409 A1 | 12/2005 | Kutzik et al. | |

FOREIGN PATENT DOCUMENTS

FR    2800882    11/2001

OTHER PUBLICATIONS

"Considerations for Process Development," [online] retrieved on Jun. 26, 2006 [Retrieved from the Internet] <URL: file:///C|/Documents%20and%20Settings/bob.sundstrom/...%20planning%20and%20tracking/WorkflowDevelopment.htm> 3 pages.

* cited by examiner

*Primary Examiner*—Matthew C Bella
*Assistant Examiner*—Dennis Rosario

(57) ABSTRACT

A computer-implemented method and system are provided for tracking image capture compliance with an image capture criteria. Method and system aspects of the exemplary embodiment include receiving user-defined criteria for specifying an image capture plan that defines at least one image capture subject and constraints associated with the at least one image capture subject; determining a progress towards completing the image capture plan based on whether information is received for an image capture occurrence of the at least one image capture subject by an image capture device, wherein multiple image capture occurrences occurring in any order are counted toward completing the image capture plan; and providing an indication of the compliance progress.

51 Claims, 11 Drawing Sheets

| Constraints for Image Capture Subjects | | |
|---|---|---|
| Arrangement | Quantity | Progress |
| Scott and Birthday Presents | 3 | 0 |
| Mona and Bob | 1 | 0 |
| Bob in Cary, NC | 2 | 0 |

|   | 400 | 402 | 404a | 404b | 408 |
|---|---|---|---|---|---|
|   |   |   | Time Frame (404) | | |
|   | Plan Name | Plan Type | Date | Time Interval | Location |
| 26a → | Bob's B-day | Birthday | 05/25/2006 | 1PM EST-<br>2PM EST | Cary, NC |

FIG. 4A

| 410 |
|---|
| Image Capture Subject Identifier(s) |
| Scott |
| Mona |
| Bob |
| Birthday Cake |
| Birthday Presents |

| Constraints for Image Capture Subjects ||| |
|---|---|---|
| Arrangement (412) | Quantity (414) | Progress (416) / (418) |
| Scott and Birthday Presents | 3 | 0 |
| Mona and Bob | 1 | 0 |
| Bob in Cary, NC | 2 | 0 |

| Notification Method (422) | Address (424) | Frequency (426) |
|---|---|---|
| Image Planner Pop-up Window | N/A | 5 minute intervals |
| Email message | Joe.user@someaddress.com | 1 every 60 minutes |
| SMS | 555-1234 | Every time an image is uploaded to the service. |
| Message to image capture device | mycamera@someaddress.com | Every time an image is uploaded to the service. |
|  |  |  |

FIG. 4D

| Filename 602 | Img001.jpeg |
|---|---|
| Time 604 | 1:30PM EST |
| Date 606 | 05/25/2006 |
| Location 608 | GPS coordinates |
| Description 610 | Scott/Mona/Bob |

600

| Constraints for Image Capture Subjects | | |
|---|---|---|
| Arrangement (412) | Quantity (414) | Progress (416) |
| Scott and Birthday Presents | 3 | 2/3 |
| Mona and Bob | 1 | 0 |
| Bob in Cary, NC | 2 | 1/2 |

METHOD AND SYSTEM FOR PHOTO PLANNING AND TRACKING

BACKGROUND

The proliferation of digital cameras continues to increase the number of people taking photos. During the process of taking photos, people play different roles. For example, people may play a conscious or subconscious role as a personal or family historian by taking photos that provide a history or story of their lives; the subjects of this photo history may include the people, objects, and events that are important to them. People also may play an official or unofficial role as chroniclers of organizations, such as soccer teams, churches, or clubs, for example.

Regardless of the roles people play, taking photographs is a continual process that requires each person to decide when to take a camera with them, when to take it out, and when and what to take pictures of. Through this decision process, people may simply forget to take pictures at moments and/or of subjects they had intended, particularly those that need to be taken on a regular basis.

As an example, a person may have every intention of taking pictures over the span of a vacation, but may end up taking photos only on the last day, loosing the moments and events of the previous days. As another example, during special events, such as a birthday party, a reunion, a wedding, a corporate event, or a philanthropic event, it is often desired to take a minimum number of shots of everyone as well as certain planned photos, such as the birthday person blowing out the candles at a birthday party, or of the best man giving a toast during a wedding. Keeping track of what photos have been taken and which photos remain can be a daunting task, whether for parents hosting the birthday party or a professional photographer at the wedding. Taking photos is a perishable opportunity—if missed, the photos cannot be taken later. Depending on the severity of these lapses in memory of the would-be photographer, a pictorial history of years or even entire relationships can be lost.

SUMMARY

A computer-implemented method and system are provided for tracking image capture compliance with an image capture criteria. Method and system aspects of the preferred embodiment include receiving user-defined criteria for specifying an image capture plan that defines at least one image capture subject and constraints associated with the at least one image capture subject; determining a progress towards completing the image capture plan based on whether information is received for an image capture occurrence of the at least one image capture subject by an image capture device, wherein multiple image capture occurrences occurring in any order are counted toward completing the image capture plan; and providing an indication of the compliance progress.

According to a further embodiment, a photo planning and tracking system and method are disclosed, which include an image planner component for receiving image capture criteria from a user in order for the user to specify an image capture plan, including the setting of goals and notification schedules; a progress monitor component for monitoring progress towards the capture of images specified in the image capture plan; and a notification service component for issuing electronic notifications of the compliance progress via multiple user-configurable delivery methods.

According to the embodiments disclosed herein, a tool is provided that enables users to plan their photos and set picture taking goals, and to receive notices of progress and reminders of photos yet to be taken, thereby ensuring that the user does not accidentally forget to take planned photos.

BRIEF DESCRIPTION OF SEVERAL VIEWS OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and:

FIG. 4A is a diagram illustrating an exemplary portion of the user-defined criteria stored in the image plan database for defining the image capture plan.

FIG. 4B is a diagram illustrating an exemplary portion of the user-defined criteria for identifying the image capture subject(s).

FIG. 4C is a diagram illustrating an exemplary portion of the user-defined criteria for defining a set of constraints for the image capture subject(s).

FIG. 4D is a diagram illustrating an exemplary portion of the user-defined criteria for defining notification information.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to the exemplary embodiment, a photo planning and tracking system and method are disclosed. The system enables a user to plan images and set goals, tracks which of the planned images have been taken, and sends the user notices of progress (or lack of progress) and/or reminders of images specified in the plan yet to be taken.

Figure 1A:
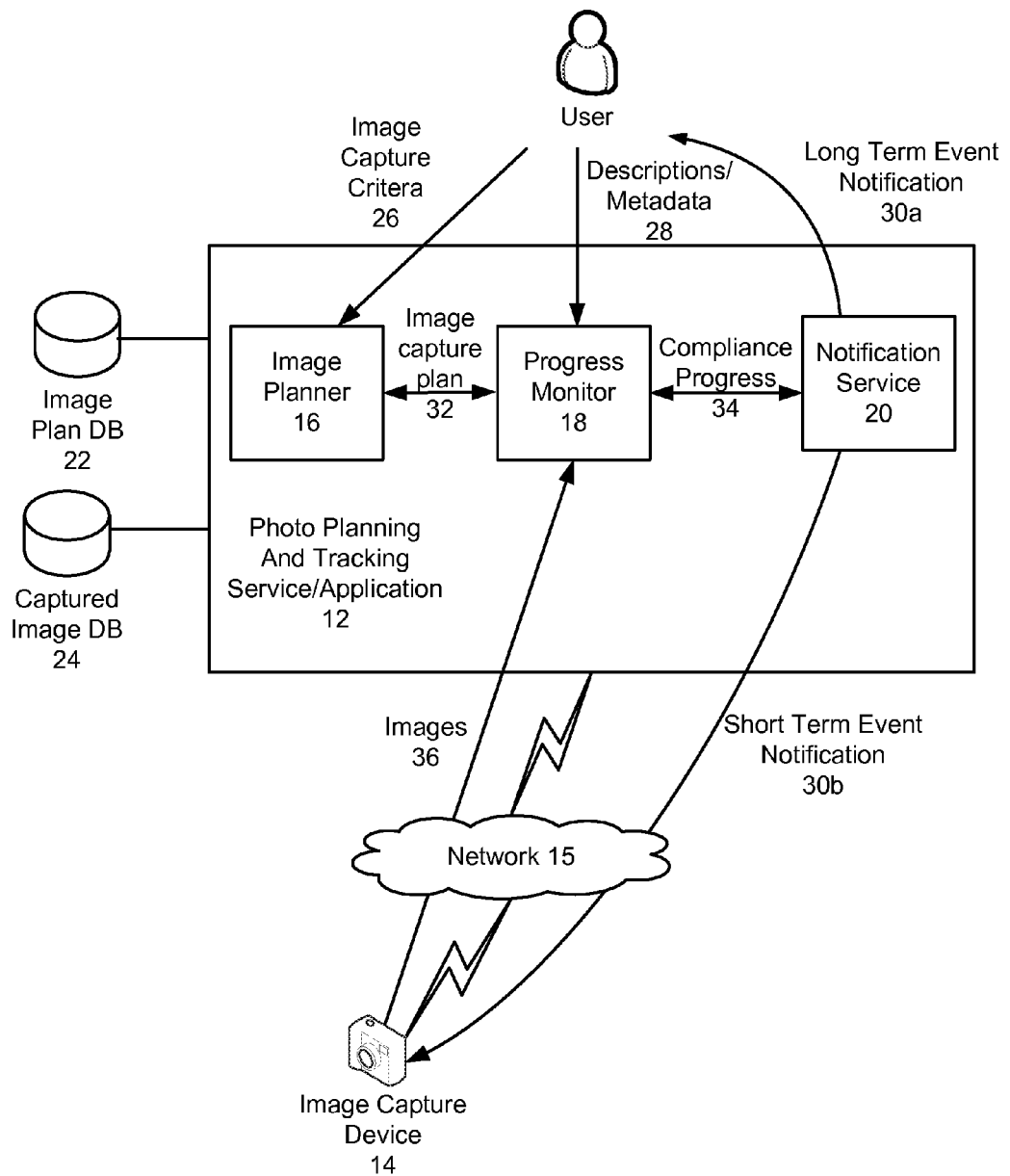
FIGS. 1A, 1B, and 1C are block diagrams illustrating several embodiments of a photo planning and tracking system.
Figure 1B:
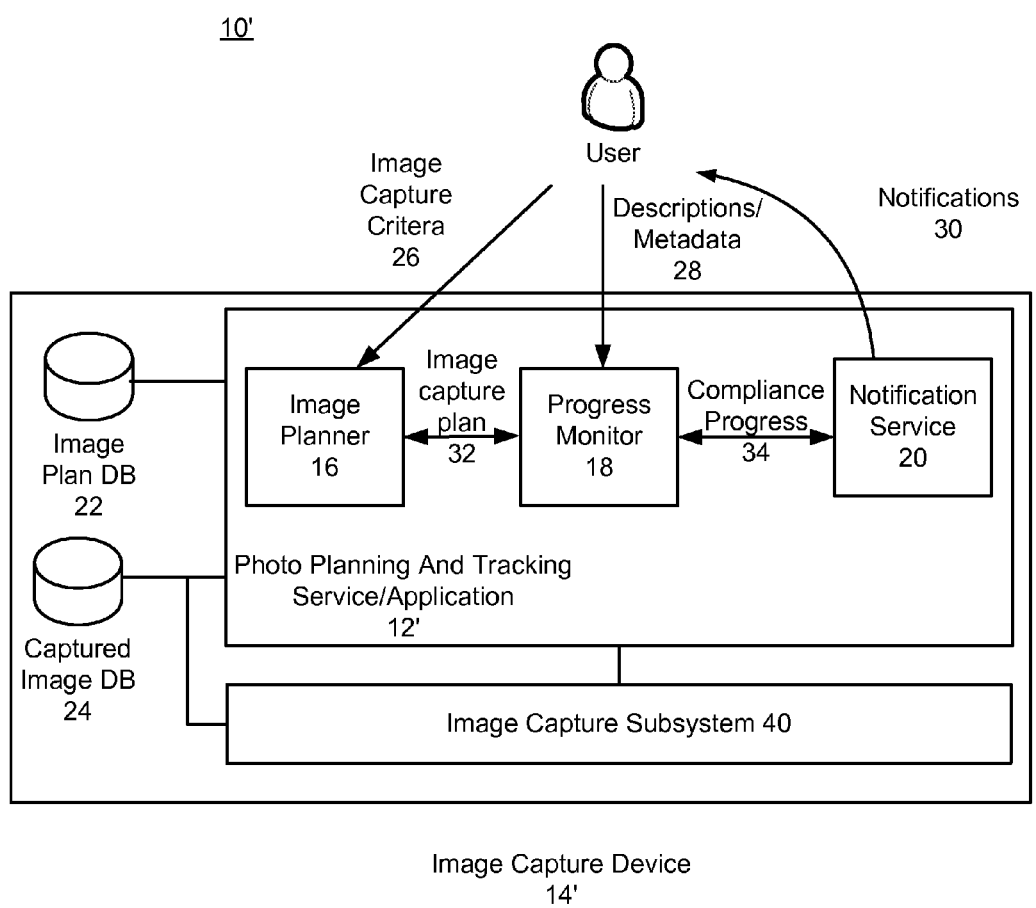
Figure 1C:
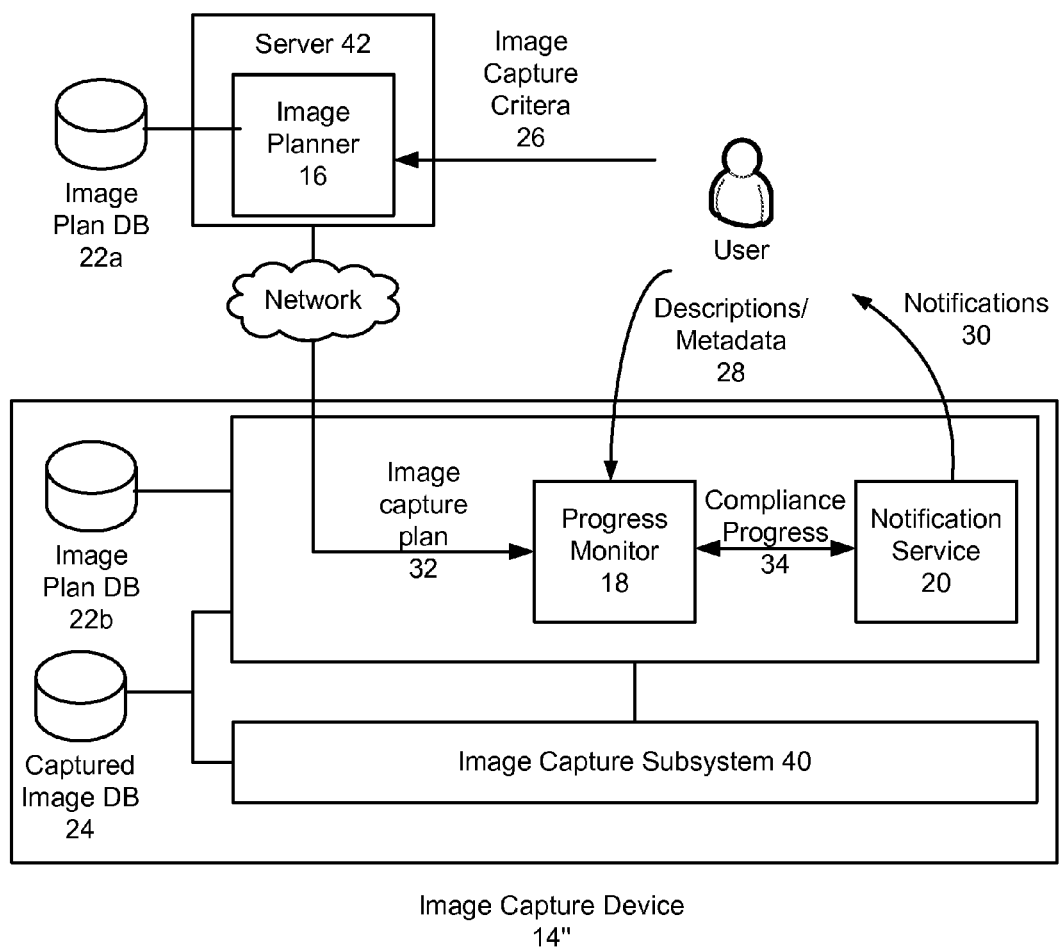

FIGS. 1A, 1B, and 1C are block diagrams illustrating several embodiments of a photo planning and tracking system, where like components include like reference numerals. The exemplary embodiment is described with reference to FIG. 1A, which shows a photo planning and tracking system 10 that is based upon a client/server model. The system 10 includes a photo planning and tracking service 12 that is accessible to a user and/or an image capture device 14 over a network 15, such as the Internet. In one embodiment, the photo planning and tracking service 12 may be part of a photosharing web site that allows a user to store and share captured images 36. A user may access the photo planning and tracking service 12 using a traditional web browser (not shown).

The image capture device 14 may be any electronic device that is capable of capturing digital still and/or video images 36. Example types of image capture devices 14 include a digital camera, digital video camera, a camera phone, a camera-equipped personal digital assistant (PDA), a personal computer (PC), and the like. If the image capture device 14 is a wireless capable device, then the image capture device 14 may upload the images 36 to the photo planning and tracking service 12 directly over the network 15. Alternatively, the images 36 may be uploaded to the photo planning and tracking service 12 from the image capture device 14 through an intermediary communication device, such as a PC. Once uploaded, the images 36 are preferably stored in a captured image database 24.

According to the exemplary embodiment, the photo planning and tracking service 12 may include means for receiving image capture criteria 26 from the user in order for the user to specify an image capture plan 32, including the setting of goals and notification schedules. For example, the photo planning and tracking service 12 may include an image planner 16 component in which the user inputs the image capture criteria 26 via a browser.

The photo planning and tracking service 12 may also include means for monitoring the progress towards the capture of images specified in the image capture plan. For example, the photo planning and tracking service may include a progress monitor 18 component that monitors information about whether or not images that have been captured and any time-based criteria associated with the image capture plan 32 (e.g., "take photos of daughter every month"). Based on the information received about the image captures or lack thereof, the progress monitor 18 may maintain a compliance progress 34 or status relative to meeting the goals specified in the image capture plan 32.

The photo planning and tracking service 12 may also include means for issuing electronic notifications of the compliance progress 34 via multiple user-configurable delivery methods. For example, the photo planning and tracking service may include a notification service 20 component that is configured to issue compliance notifications 30a and 30b (collectively referred to as notifications 30) to one or more recipients using a variety of delivery methods, such as display on a website, sending of an electronic message to an image capture device, or sending an electronic message to a user device like a PC or a cell phone.

FIG. 1B shows a second embodiment of the photo planning and tracking system 10' in which components of a photo planning and tracking application 12' are executed in the image capture device 14'. In this embodiment, the user provides the image capture criteria 26 to the image planner 16 through a user interface (UI) (not shown) of the image capture device 14'. After an image capture, the user may enter a description/metadata 28 describing the captured image through the image capture device 14' UI, while the progress monitor 18 monitors compliance progress with the image capture plan 32. The notification service 20 may then display the compliance progress notifications 30 on the image capture device 14'.

FIG. 1C shows a third embodiment of the photo planning and tracking system 10", which is a combination of the first embodiment of FIG. 1A and the second embodiment of FIG. 1B. In the third embodiment, the image planner 16 is hosted on a server 42, and the image capture plan 32 is downloaded to the image capture device 14", which executes the progress monitor 18 and notification service 20. The user accesses the image planner 16 via a website and enters the image capture criteria 26, taking advantage of the processing power, storage and GUI provided by the server 42. The image capture plan 32 created by the user may be stored in the image plan database 22a of the server 42, which may also store the image capture plans created by other users, as well as on a local image plan database 22b in image capture device 14".

Although the image planner 16, the progress monitor 18, and the notification service 20 are shown as separate software components in FIGS. 1A-1C, the functionality provided by the image planner 16, the progress monitor 18, and the notification service 20 may be implemented using a fewer or a greater number of software components.

Figure 2:
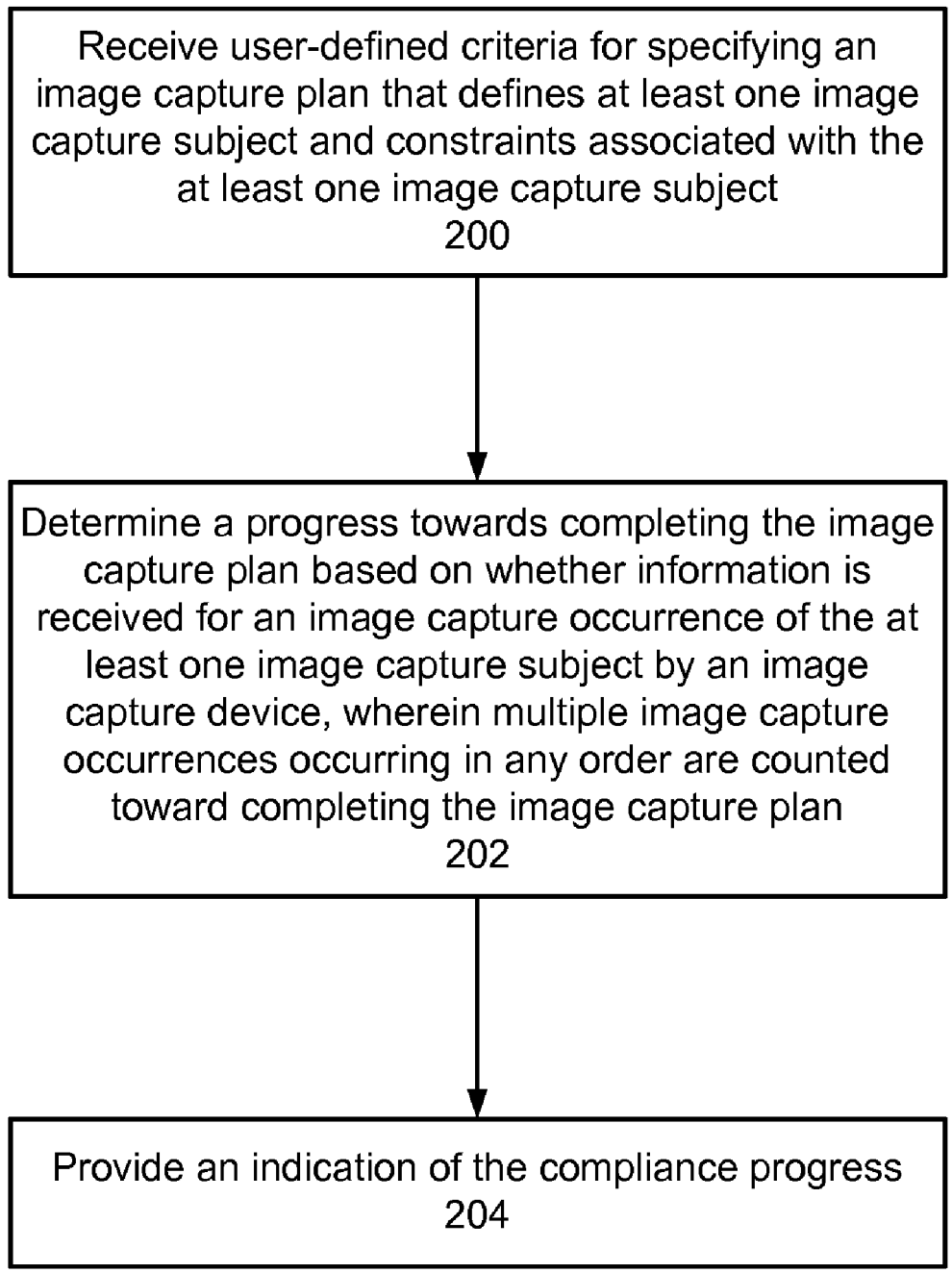
FIG. 2 is a flow diagram illustrating the process of tracking image capture compliance with image capture criteria in accordance with the exemplary embodiment.

FIG. 2 is a flow diagram illustrating the process of tracking image capture compliance with image capture criteria in accordance with the exemplary embodiment. The process begins in step 200 in which the photo planning and tracking service 12 receives the image capture criteria 26 from the user for specifying an image capture plan 32 that defines at least one image capture subject and constraints associated with the at least one image capture subject.

The user-defined image capture criteria 26 can be stored in the image plan database 22 to define the image capture plan 32 and compared to the metadata associated with the captured images 36 that is provided to the photo planning and tracking service 12. The purpose for creating the image capture plan 32 is to ensure that the user captures all of the desired pictures associated with a specified image capture event. The image capture plan 32 minimally provides a list of photos that the user will want to take during an event. Events can be short-term or long-term. For example, a short-term event could be a birthday party, while a long-term event could be a super model photo shoot over a week or the collection of events (e.g., practices, games, and banquets) associated with a youth soccer team over a season. The impetus for creating the image capture plan 32 is that image capture events have finite time-frames from which the desired photos can be captured.

In operation, the image planner 16 preferably displays a form for allowing the user to enter the image capture criteria 26 to create a list of images specified for capture during one or more image capture occurrences. Each image on the list may be defined by identifying the subjects for image capture, such as the names of people or groups, roles (e.g., bride, groom, etc.), events, objects, and locations.

The constraints entered by the user may include settings for specifying a time-frame for completing an image capture occurrence, a quantity or number of images to be captured for the image capture subject, location information for specifying an image capture location for the image, scenery information for an image capture occurrence, such as background, clothing, and the like, an arrangement specifying which image capture subjects should be in a particular image, and other constraints related to an image capture occurrence. Each image capture subject may have its own set of constraints, or a set of constraints may be associated with a group of image capture subjects. The constraints may be manually entered by the user and/or provided to the user. For example, the image planner 16 may draw from contacts listed in a contact list of the user and then display the contacts for user selection. The image capture criterion 26 that defines the image capture plan 32 is preferably stored in the image plan database 22.

In step 202, the photo planning and tracking service 12 determines a progress towards completing the image capture plan based on whether information is received for an image capture occurrence of at least one of the image capture subjects by an image capture device 14, where multiple image capture occurrences occurring in any order are counted toward completing the image capture plan 32. Information received for the image capture occurrence may include metadata associated with the image and/or the time-frame specified for the image capture. Once metadata associated with a captured image 36 is received, progress towards completing the image capture plan 32 can be determined by comparing the image capture criteria 26 to the metadata. The metadata associated with an image 36 may include metadata associated with the image 36 by the image capture device 14 during the image capture occurrence, the description/metadata 28 provided by the user to photo planning and tracking system 12 either from the image capture device 14 or on a website, or metadata automatically generated from the captured image.

According to the exemplary embodiment, the order in which images specified in the image capture plan 32 are captured does not affect the compliance progress 34, meaning that the capture of images listed in the image capture plan 32 may occur in any sequence. Compliance with the plan 32 is completed once it is determined that all the images 36 are captured within the time-frame specified in an image capture plan 32. Alternatively, the user may be allowed to define the image capture plan 32 such that strict image capture occurrence order is required in order to count toward compliance with the plan 32.

Progress towards plan 32 completion may be based on both identifying which images 36 were captured from the information received for an image capture occurrence, and whether each image 36 in the plan 32 was captured within a predetermined threshold of the time-frame specified in the image capture plan 32. Thus, by monitoring time-frame constraints, the progress monitor is capable of tracking the progress towards plan completion even if the progress monitor received no information about an actual image being captured.

In step 204, the photo planning and tracking service 12 provides an indication of the compliance progress, preferably using the notification service 12. The indication of the compliance progress is preferably provided via notifications. The notifications may include identification of the images that have yet to be taken, and/or an identification of the images that have been taken. The notification service 20 may be configured either to provide notifications via the photo planning and tracking service 12 website, on the image capture device 14, or via an electronic message, such as email or short message service (SMS), sent to a specified address (e.g. of the user or other recipient). In accordance with the exemplary embodiment, a notification that is associated with a long-term event(s) (e.g., monthly photos), referred to here as a long-term event notification 30a, is preferably provided to the user via a web page or electronic message, while a notification associated with a short-term event(s) (e.g., a birthday party), referred to here as a short-term event notification 30b, is provided directly on the image capture device 14. It should be noted that the notifications 30a and 30b (collectively referred to herein as notifications 30) may be sent to the same or different user than the user who submitted the image capture criteria 26. Similarly, the user who submitted the image capture criteria 26 may be the same or different from the user of the image capture device 14.

Figure 3:
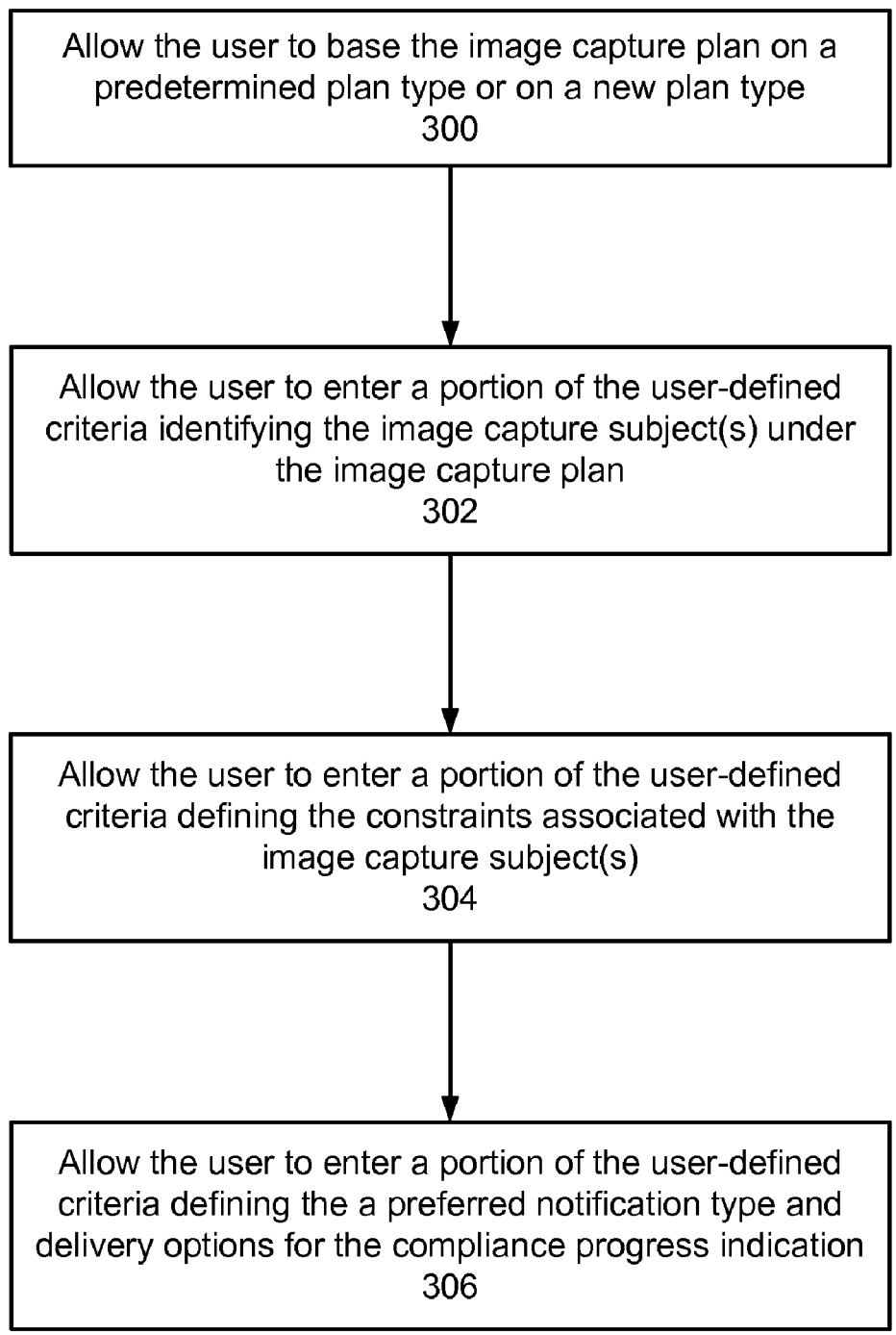
FIG. 3 is a flow diagram describing in further detail the process performed by the image planner for generation of the image capture plan.

Referring now to FIG. 3, a flow diagram is shown describing in further detail the process performed by the image planner 16 for generation of the image capture plan 32 according to one specific exemplary embodiment. The image planner process begins in step 300 by allowing the user to base the image capture plan 32 on a predetermined plan type or on a new plan type created by the user. Example predetermined plan types include Birthday Party, Holiday, Family Reunion, and so forth. The reason for providing plan types is to provide a starting point for the user and to provide and suggest default configurations to make creating the image capture plan 32 an easier task. After selecting or creating a plan type, the user may provide a name for the image capture plan 32 and optionally provide date, time and location information about the event associated with the image capture plan 32.

FIG. 4A is a diagram illustrating an exemplary portion of the user-defined criteria 26a stored in the image plan database 22 for defining the image capture plan 32. In this particular example, the image capture plan 32 may include fields for storing a plan name 400, a plan type 402, a time-frame 404 for the event that includes a date 404a of the image capture event, and a time interval 404b, and a location 406 of the event. Note: this is not an exhaustive representation of what data can be stored for the image capture plan 32. For example, the location field 406 could contain GPS data and both a start and end date could be included in the time-frame 56.

Referring again to FIG. 3, after the image planner 16 receives the user-defined image capture criteria 26a defining the image plan 32 itself, the image planner 16 in step 302 allows the user to enter a portion of the user-defined criteria 26 that identifies the image capture subject(s) under the image capture plan 32.

FIG. 4B is a diagram illustrating an exemplary portion of the user-defined criteria 26b for identifying the image capture subject(s) 410. The image capture subjects 410 are the objects that will be captured in the pictures during the event. In this example, the user has identified several image capture subjects 410 by entering names/descriptions for each. The image capture subjects 410 identified may include both animate and inanimate objects. For example, if the image capture plan type is Birthday, then the image capture subjects 410 may include the birthday person, birthday presents, birthday cake, relatives of the birthday person, and so on. Note: this is not an exhaustive representation of what the image plan database 22 may contain. For example, the image capture subjects 410 could be abstracted to relational information such as family members=brother, sister, mother, father, etc.

Referring again to FIG. 3, after the image planner 16 receives the user-defined criteria 26b identifying the image capture subject(s) 410, the image planner 16 in step 304 allows the user to enter a portion of the user-defined criteria 26 defining the constraints associated with the image capture subject(s) 410. Constraints are settings that help to remind the user to take pictures having particular qualities.

FIG. 4C is a diagram illustrating an exemplary portion of the user-defined criteria 26c for defining a set of constraints 414 for the image capture subject(s) 410. In this example, the constraints 414 include a setting defining the arrangement 412 specifying which image capture subject(s) 410 should be in a particular image, a setting specifying the desired quantity 416 of images of each arrangement 412. In addition, a progress counter 418 may also be provided, that is used to indicate captured image compliance. The progress counter 418 is typically updated by the progress monitor 18 when images are captured, but may also be updated by the user to indicate that previously captured images meeting the specified criteria should count towards meeting the plan goals.

In order to make creating the arrangements 412 easier, Boolean operators could be provided via a GUI within the image planner 16. One example could be that the user would be able to click on image capture subject(s) 410 and drag them into a box that would generate the arrangement 412. The example user-defined criteria 26c shown is not an exhaustive representation of what settings the constraints 414 may contain. For example, the arrangement 412 could include location information from the image plan 32 shown in FIG. 4A. Although the constraints 414 shown are relatively simple, more complicated rule sets could be created to generate arrangements 412 for the image capture subjects. Also, the arrangement 412 may be used as the image capture subject 410 or in addition to the image capture subject 410. Other example constraints include:

That a particular number of pictures is to be taken of a person.

That at least one picture of the birthday cake and the birthday boy is taken.

That there is a picture of the cat in a hat.

That there is a picture of the bride and the maids of honor.

That there is a picture of Alice on the beach

Referring again to FIG. 3, the image planner 16 in step 306 may also allow the user to enter a portion of the user-defined criteria defining notification information for the compliance progress indication, including a preferred notification type and delivery method. This notification information will be used to provide the progress indication for the user.

FIG. 4D is a diagram illustrating an exemplary portion of the user-defined criteria 26d for defining notification information 420. The notification information 420 may include a notification method 422, an address 424 for sending the notification via the notification method 422 if necessary, and a frequency 426 of how often the notification or reminder should be sent. The notification service 20 may access the notification information 420 from the image plan database 22 to implement the notification function. Some example notification methods 422 provided by the notification service 20 may include a pop-up window, email, SMS, an audible message, webpage, and the like. The address information may be needed if a notification 30 will be sent outside of the photo planning and tracking service 12. The frequency 426 could be based on time intervals or based upon actions.

After the user completes the process of entering the image capture criteria 26, the progress monitor 18 begins to monitor compliance with the image capture plan 32.

Figure 5:
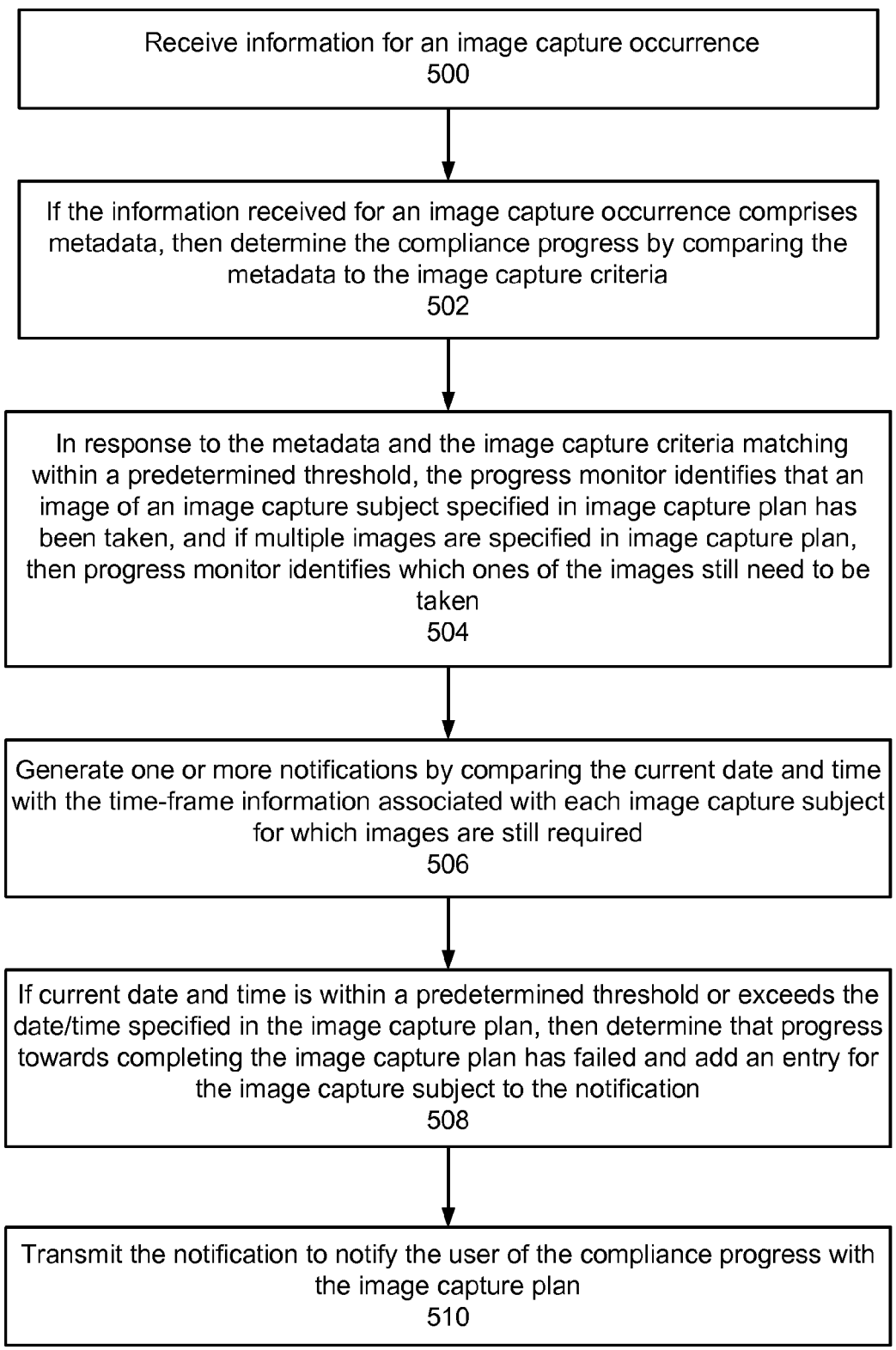
FIG. 5 is a flow diagram illustrating the process of determining progress towards completing the image capture plan in further detail.

FIG. 5 is a flow diagram illustrating the process of determining progress towards completing the image capture plan in further detail according to an exemplary embodiment. The process begins in step 500 by the progress monitor 18 receiving information for an image capture occurrence. As stated above, the information received for an image capture occurrence preferably comprises metadata that is associated with the images 26 and/or the time-frame information 406 from the image capture plan 32. The progress monitor 18 may process information received regarding each image capture occurrence, i.e., image files and/or image metadata, as it is received, or may process received information in batches.

The metadata associated with a captured image 36 may originate from one or more of the following: the image capture device 14, which automatically associates capture information from the image capture occurrence with a captured image 36; a description/metadata 28 for the captured image entered by the user after the image capture occurrence either on the image capture device 14 or the photo planning and tracking service 12 web site; or the metadata can be automatically generated from the captured image 36, for example, by using face recognition, scene recognition or the image capture location, described below.

After an image capture occurrence, the user may provide the images captured during an event to the photo planning and tracking service/application 12, and/or the user may provide user entered metadata for the captured images 36, whereupon the progress monitor 18 can process the captured images 36 and determine the progress that is being made towards completing the image capture plan 32.

There are many ways that the captured images 36 can be provided to the photo planning and tracking service/application 12, such as the following: transferring the captured images 36 from the image capture device 14 to a PC either by a direct connection or via a removable storage device such as a memory card or USB stick, and uploading the images, via email, and sending the images 36 directly using a web service or other protocol. Once uploaded, the images are stored in the captured image database 24 so that they can be processed. The user may be given the opportunity to indicate which image capture plan 32 the uploaded image should be processed against. It should also be understood that the images may come from several people. For example, during a family vacation several members may contribute images for a designated image capture plan.

Figures 6, 9:
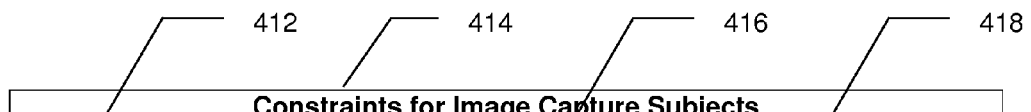
FIG. 6 is a diagram illustrating an example capture image entry in the captured image database.
FIG. 9 is a diagram illustrating an update of a progress counter as a result of metadata processing for the example set of constraints shown in FIG. 4C.

As is well known to those of ordinary skill in the art, most images 36 captured by image capture device 14 are provided with a minimal set of metadata that can be read from the images, as shown in FIG. 6.

FIG. 6 is a diagram illustrating an example capture image entry 600 in the captured image database 24. Typically, the image capture device 14 used to capture the image 36 provides the following metadata for the image 36: a filename 602, a time of capture 604, and date 606. Optional metadata may include location 608 (e.g., provided by a global positioning system), and a description/subject 610 provided by the user. Note: This is not an exhaustive representation of what data can or will be contained in captured image database 24.

One alternative to uploading the captured images 36 is to allow the user to provide only the description/metadata 28 for each image 36 to the progress monitor 18. This embodiment would be more efficient if the actual image files do not need to be examined. The user may provide the description/metadata 28 for each image 36 either to the photo planning and tracking service 12 via a website as in FIG. 1A, or simply enter the description/metadata 28 into the image capture device 14' as in FIG. 1B.

Whether or not the user uploads the captured images 36, the user is provided with the opportunity to enter and associate information/metadata 28 with the captured images 36 after image capture (either on the capture device or on the website). In accordance with a further embodiment, the progress monitor 18 may utilize elements entered from the image capture criteria 26, such as the image capture subject identifiers 410 and arrangements 412, to display to the user for selection to ease data entry, as shown in FIG. 7.

Figure 7:
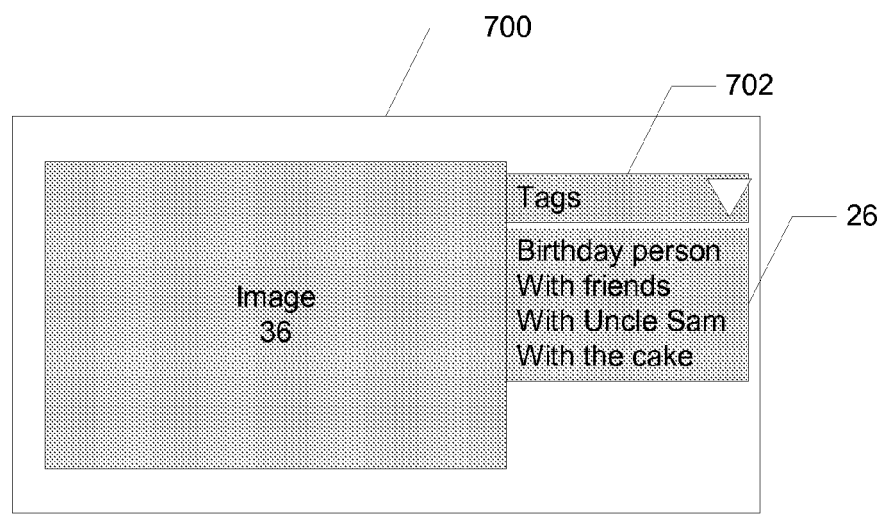
FIG. 7 shows an exemplary user interface for allowing the user to associate metadata with a captured image.

FIG. 7 shows an exemplary user interface 700 for allowing the user to associate metadata with a captured image 36 in which the captured image 36 is displayed along side a pull-down list 702 of portions of the image capture criteria 26 from the plan 32. In this example, the pull-down list displays the arrangements information 412 for user selection. Once the user selects an item from the list, the selection is associated with the captured image 36 as a metadata tag.

Another alternative to assigning metadata is configuring the progress monitor 18 to automatically generate and associate metadata with a captured image. As stated above, this can be performed through the use of facial recognition and scene recognition, as shown in FIG. 8.

Figure 8:
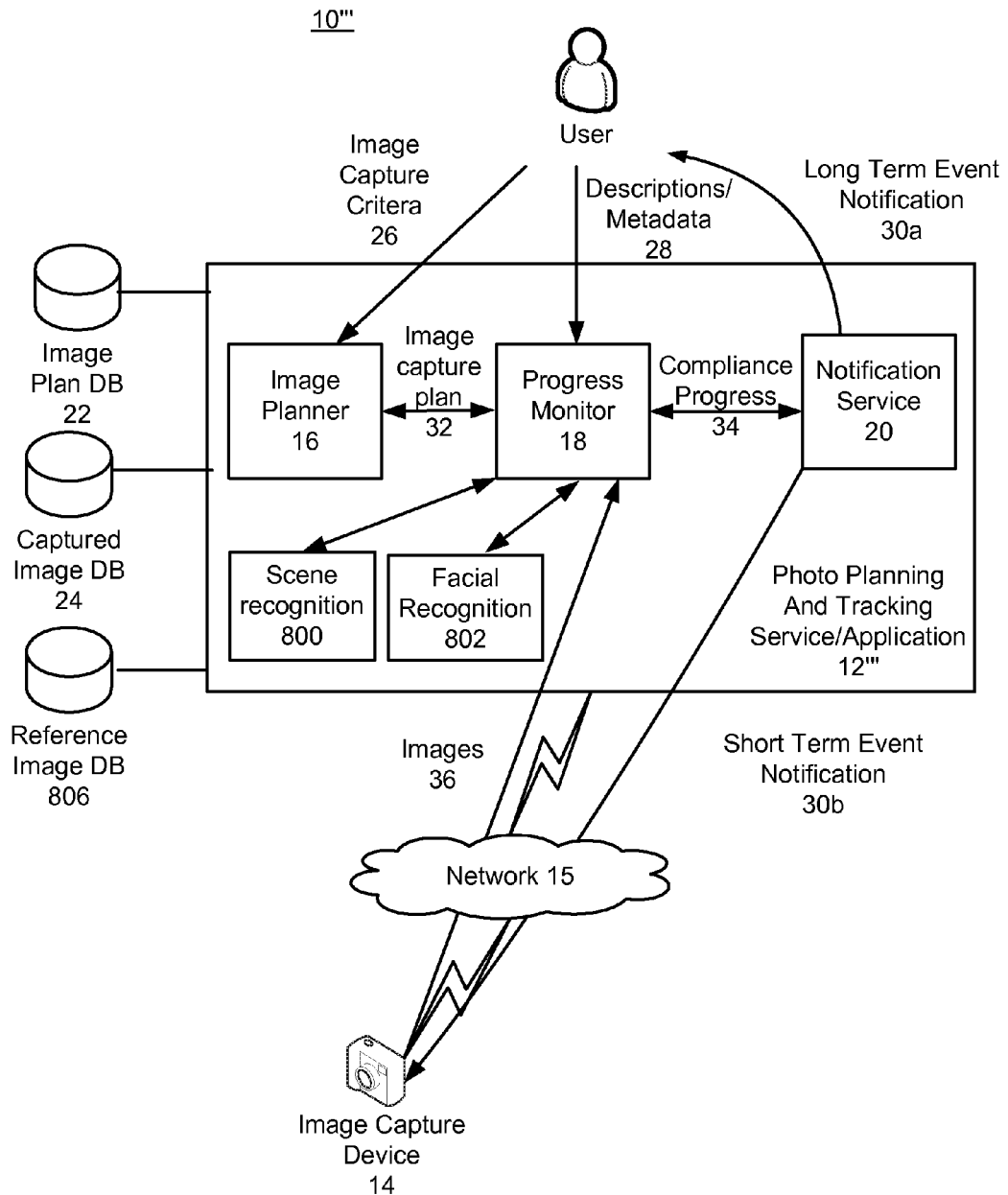
FIG. 8 is a block diagram of a further embodiment for the photo planning and tracking service shown in FIG. 1A, which relieves the user from the task of adding metadata tags to the captured images.

FIG. 8 is a block diagram of another embodiment for the photo planning and tracking service shown in FIG. 1A, which relieves the user from the task of adding metadata tags to the captured images 36. Rather, the user can provide the captured images 36 to the progress monitor 18, which inputs the images 36 to software applications, such as a scene recognition component 800 or a facial recognition component 802, for automatic generation of the metadata. The progress monitor 18 may then use the output from facial recognition and/or scene recognition components 800 and 802 to analyze the images 36 to determine if the images 36 match the image capture criteria 26. For example, if the user had specified that an image of the birthday girl be taken with the cake, the system 10''' would analyze each image to see if there was a match.

Facial recognition typically requires a reference image. Since users typically take photos of relatives and friends, these types of images may be readily available from a digital family photo album. Such reference images may be stored in a reference image database 806. Although there may not be a reference photo available for every person depicted in the captured images 36, a match of just a portion of the image capture subjects can be helpful. Reference images may also be retrieved from other sources, such as work or school image directories. Another source might include email signatures. If a reference image is not found, facial recognition could still be used to track the subjects and assign a temporary or blank identifier so that the user can fill-in the names later (3 shots of person x, 4 of person y, etc). In the case where there is not enough metadata for the progress monitor 18 to process, then the user may be prompted to provide additional metadata for those image files.

Referring again to FIG. 5, in step 502, if the information received for an image capture occurrence comprises metadata, then the progress monitor 18 determines the progress in complying with the image capture criteria by comparing the metadata to the image capture criteria 26 defining the image capture plan 32 stored in the image plan database 22. In step 504, in response to the metadata and the image capture criteria 26 matching within a predetermined threshold, the progress monitor 18 identifies that an image of an image capture subject specified in image capture plan 32 has been taken, and if multiple images are specified in image capture plan, then progress monitor 18 identifies which ones of the images still need to be taken. In the exemplary embodiment, the progress monitor 18 identifies that an image of an image capture subject specified in image capture plan 32 has been taken by updating the progress counter 418.

FIG. 9 is a diagram illustrating the progress counter 418 updated as a result of metadata processing for the example set of constraints shown in FIG. 4C. The progress monitor 18 may continue to update the progress counter 418 until the quantity 416 value has been reached. Uploaded images 36 that do not match image capture criteria 26 or exceed the specified quantity may be kept in the captured image database 24 and associated with the image capture plan 32, but do not contribute towards progress in completing the image capture plan 32.

Referring again to FIG. 5, after the metadata has been processed and/or according to a preset schedule, in step 506 one or more notifications 30 is generated by comparing the current date and time with the time-frame information 406 associated with each image capture subject for which images are still required (as indicated by the progress counter 418).

In step 510, if the current date and time is within a predetermined threshold or exceeds the date/time specified in the image capture plan 32 (e.g., within 1 hour of the specified date), then it is determined that progress towards completing the image capture plan 32 has failed and an entry for the image capture subject is added to the notification 30. In one embodiment, the notification service 20 generates the notifications 30 based upon a frequency value set by the user. In an alternative embodiment, the progress monitor 18 generates the notifications 30. In step 510, the notification service 20 transmits the generated notification 30 to notify the user of the compliance progress 34 with the image capture plan 32.

According to the exemplary embodiment, the notifications 30 only indicate those images that have not yet been captured based on the quantity 416 value set for them. An example notification 30 message is shown below.

```
******** Attention Joe Smith ********
Pictures Left to Take:
(1) of Scott and Birthday presents
(1) of Mona and Bob
*********End Message*************
```

The content of the notification 30 can vary, depending on for example, the delivery method used to send a notification, and multiple methods can be used to send the notifications 30. For example, a notification 30 sent via an email message may list image capture subjects 410 or arrangements 412 that have not yet been captured, as shown in the example above. Alternatively, if the user views the notification 30 via a browser, the notification 30 may display the entire image capture plan 32, with an indication of which image capture subjects 410 or arrangements 412 have been completed and which remain to be completed. Or, if an SMS message is used, the notification 30 may simply report that there are photos remaining to be taken and contain a link to a website from which the image capture plan 32 can be accessed.

According to a further embodiment, the time-frame 404 information may be obtained from sources other than image capture plan 32. For example, the photo planning and tracking service/application 12 may monitor the user's electronic calendar entries and search for particular events, people, or places. If an image of that person, place, or event is needed to complete an image capture plan (ICP), a reminder is sent. Reminders can be sent before events and also during events. Calendar entries can also be used to set up reminders by activity, for example, the photo planning and tracking service/application 12 can check for certain types of events on calendars and could notice recurring events, e.g., Ballet lessons for Amanda, on the calendar. The system then could send a reminder to the user to access image planner 16 and specify any photo goals for this activity.

A method and system for planning and tracking image capture compliance has been disclosed. The method and system of the exemplary embodiments provide users a tool for ensuring that planned picture taking opportunities are not accidentally forgotten. The method and system encourages and enables the planning of images, tracks which images have been taken and which need to be taken, and reports the progress to the user via a variety of delivery methods.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method of tracking image capture compliance with an image capture criteria, the method comprising:
    receiving user-defined criteria for specifying an image capture plan that defines at least one image capture subject and constraints associated with the at least one image capture subject, the image capture plan including a list of images based on the at least one image capture subject and the constraints;
    determining a progress towards completing the image capture plan based on whether information is received for an image capture occurrence of the at least one image capture subject by an image capture device, wherein multiple image capture occurrences occurring in any order are counted toward completing the image capture plan; and
    providing an indication of the compliance progress, the indication including a notification identifying at least one image from the list of images that has not been captured.

2. The method of claim 1 wherein the image capture plan comprises a list of images specified for capturing during one or more image capture occurrences.

3. The method of claim 2 wherein the constraints associated with the at least one image capture subject include at least one of:
    a time-frame for completing the one or more image capture occurrences,
    a quantity of images to be captured for the image capture subject,
    location information for specifying an image capture location for the captured image,
    scenery information; and
    an arrangement specifying which image capture subjects should be in a particular captured image.

4. The method of claim 3 wherein the information received for the image capture occurrence includes at least one of metadata associated with an image captured during the image capture occurrence, and the time-frame specified for completing the image capture occurrence.

5. The method of claim 3 wherein if the information is received for the image capture occurrence, then determining the progress towards completing the image capture plan comprises comparing the received information with the user-defined criteria.

6. The method of claim 5 further comprising:
    in response to a match of at least a portion of the metadata resulting from the comparison, identifying that an image of the image capture subject specified in the image capture plan has been taken, and if multiple images are specified in the image capture plan, identifying which images still need to be taken.

7. The method of claim 4 wherein the metadata associated with the image includes at least one of:
    metadata associated with the image by the image capture device,
    metadata provided by the user, and
    metadata automatically generated from the captured image.

8. The method of claim 7 wherein the metadata is automatically generated from the captured image using at least one of using face recognition, scene recognition, and location of the image capture occurrence.

9. The method of claim 4 wherein determining progress towards completing the image capture plan comprises using the time-frame for completing the one or more image capture occurrences to determine a lack of progress towards completing the image capture plan.

10. The method of claim 9 further including determining that progress towards completing the image capture plan has failed if at least one of a date/time specified in the time-frame information has passed and if a current date/time is within a predetermined threshold of the specified date/time.

11. The method of claim 10 wherein the time-frame information is obtained from sources other than the image capture plan, including an electronic calendar that is searched for particular events and people.

12. The method of claim 3 further including allowing the information about the captured image to be entered after image capture by displaying the captured image along with the user-defined criteria in the image capture plan for user selection, and associating the selected image capture subject with the image.

13. The method of claim 1 wherein providing an indication of the compliance progress further includes providing an identification of images that have yet to be taken.

14. The method of claim 1 wherein providing an indication of the compliance progress further includes providing an identification of the images that have been taken.

15. The method of claim 1 wherein display of the indication of the compliance progress is configurable, including one or more of being displayed on an image capture device, on a web site, and delivered via an electronic message.

16. The method of claim 1 wherein the receiving user-defined criteria includes allowing the image capture plan to be based on a predetermined plan type.

17. The method of claim 16 wherein the predetermined plan type provides default configurations for creating the image capture plan.

18. The method of claim 16 further including allowing plan types to be created.

19. A system for tracking image capture compliance with an image capture criteria, the system comprising:
    an image planner component for receiving user-defined criteria for specifying an image capture plan that defines at least one image capture subject and constraints associated with the at least one image capture subject, the image capture plan including a list of images based on the at least one image capture subject and the constraints;
    a progress monitor component for determining a progress towards completing the image capture plan based on whether information is received for an image capture occurrence of the at least one image capture subject by an image capture device, wherein multiple image capture occurrences occurring in any order are counted toward completing the image capture plan; and
    a notification service component for providing an indication of the compliance progress, the indication including a notification identifying at least one image from the list of images that has not been captured.

20. The system of claim 19 wherein the image capture plan comprises a list of images specified for capturing during one or more image capture occurrences.

21. The system of claim 20 wherein the constraints associated with the at least one image capture subject include at least one of:
    a time-frame for completing the one or more image capture occurrences, a quantity of images to be captured for the image capture subject, location information for specifying an image capture location for the captured image, scenery information, and an arrangement specifying which image capture subjects should be in a particular captured image.

22. The system of claim 21 wherein the information received for the image capture occurrence includes at least one of metadata associated with an image captured during the image capture occurrence, and the time-frame specified for completing the image capture occurrence.

23. The system of claim 21 wherein if the information is received for the image capture occurrence, then determining the progress towards completing the image capture plan comprises comparing the received information with the user-defined criteria.

24. The system of claim 23 further comprising:

in response to a match of at least a portion of the metadata resulting from the comparison, identifying that an image of the image capture subject specified in the image capture plan has been taken, and if multiple images are specified in the image capture plan, identifying which images still need to be taken.

25. The system of claim 22 wherein the metadata associated with the image includes at least one of:

metadata associated with the image by the image capture device, metadata provided by the user, and metadata automatically generated from the captured image.

26. The system of claim 25 wherein the metadata is automatically generated from the captured image using at least one of using face recognition, scene recognition, and location of the image capture occurrence.

27. The system of claim 22 wherein the progress monitor determines progress towards completing the image capture plan by using the time-frame for completing the one or more image capture occurrences to determine a lack of progress towards completing the image capture plan.

28. The system of claim 27 wherein the progress monitor determines that progress towards completing the image capture plan has failed if at least one of a date/time specified in the time-frame information has passed and if a current date/time is within a predetermined threshold of the specified date/time.

29. The system of claim 28 wherein the time-frame information is obtained from sources other than the image capture plan, including an electronic calendar that is searched for particular events and people.

30. The system of claim 21 further including allowing the information about the captured image to be entered after image capture by displaying the captured image along with the user-defined criteria in the image capture plan for user selection, and associating the selected image capture subject with the image.

31. The system of claim 19 wherein providing an indication of the compliance progress further includes providing an identification of images that have yet to be taken.

32. The system of claim 19 wherein providing an indication of the compliance progress further includes providing an identification of the images that have been taken.

33. The system of claim 19 wherein display of the indication of the compliance progress is configurable, including one or more of being displayed on an image capture device, on a web site, and delivered via an electronic message.

34. The system of claim 19 wherein the image planner component provides for the image capture plan to be based on a predetermined plan type.

35. The system of claim 34 wherein the predetermined plan type provides default configurations for creating the image capture plan.

36. The system of claim 34 further including allowing plan types to be created.

37. A system for tracking image capture compliance with an image capture criteria, the system comprising:

means for receiving user-defined criteria for specifying an image capture plan that defines at least one image capture subject and constraints associated with the at least one image capture subject, the image capture plan including a list of images based on the at least one image capture subject and the constraints;

means for determining a progress towards completing the image capture plan based on whether information is received for an image capture occurrence of the at least one image capture subject by an image capture device, wherein multiple image capture occurrences occurring in any order are counted toward completing the image capture plan; and means for providing an indication of the compliance progress, the indication including a notification identifying at least one image from the list of images that has not been captured.

38. An image capture device, comprising:

an image planner component for receiving user-defined criteria for specifying an image capture plan that defines at least one image capture subject and constraints associated with the at least one image capture subject, the image capture plan including a list of images based on the at least one image capture subject and the constraints;

a progress monitor component for determining a progress towards completing the image capture plan based on whether information is received for an image capture occurrence of the at least one image capture subject by an image capture device, wherein multiple image capture occurrences occurring in any order are counted toward completing the image capture plan; and a notification service component for providing an indication of the compliance progress, the indication including a notification identifying at least one image from the list of images that has not been captured.

39. An image capture device, comprising:

means for receiving user-defined criteria for specifying an image capture plan that defines at least one image capture subject and constraints associated with the at least one image capture subject, the image capture plan including a list of images based on the at least one image capture subject and the constraints;

means for determining a progress towards completing the image capture plan based on whether information is received for an image capture occurrence of the at least one image capture subject by an image capture device, wherein multiple image capture occurrences occurring in any order are counted toward completing the image capture plan; and means for providing an indication of the compliance progress, the indication including a notification identifying at least one image from the list of images that has not been captured.

40. A non-transistory computer-readable medium containing program instructions for tracking image capture compliance with an image capture criteria, the program instructions for:

receiving user-defined criteria for specifying an image capture plan that defines at least one image capture subject and constraints associated with the at least one image capture subject, the image capture plan including a list of images based on the at least one image capture subject and the constraints;

determining a progress towards completing the image capture plan based on whether information is received for an image capture occurrence of the at least one image capture subject by an image capture device, wherein multiple image capture occurrences occurring in any order are counted toward completing the image capture plan; and providing an indication of the compliance progress, the indication including a notification identifying at least one image from the list of images that has not been captured.

41. A photo planning and tracking system, comprising:

an image planner component for receiving image capture criteria from a user in order for the user to specify an image capture plan, including the setting of goals and notification schedules, the image capture plan including a list of images based on the at least one image capture subject and the constraints;

a progress monitor component for monitoring progress towards the capture of images specified in the image capture plan; and a notification service component for issuing electronic notifications of the compliance progress via multiple user-configurable delivery methods, the notifications identifying at least one image from the list of images that has not been captured, wherein at least one of the system components includes at least one electronic hardware component.

42. The photo planning and tracking system of claim 41 wherein the progress monitor component monitors information about whether or not images have been captured and any time-based criteria associated with the image capture plan.

43. The photo planning and tracking system of claim 42 wherein the notification service component is configured to issue compliance notifications to one or more recipients using delivery methods including display on web site and by sending an electronic message.

44. The photo planning and tracking system of claim 43 wherein the progress monitor maintains a compliance progress relative to meeting the goals specified in the image capture plan based on the received information about the image captures.

45. The photo planning and tracking system of claim 44 wherein the image planner component is hosted by a server and receives the image capture criteria from the user over a network via a browser.

46. The photo planning and tracking system of claim 45 wherein the progress monitor and the notification service are hosted on the server.

47. The photo planning and tracking system of claim 45 wherein the progress monitor and notification service are executed on the image capture device and the image capture criteria is provided from the progress monitor to progress monitor on the image capture device.

48. The photo planning and tracking system of claim 44 wherein the image planner component is executed on an image capture device and the image capture criteria is received from the user via entry on the image capture device.

49. The photo planning and tracking system of claim 48 wherein the progress monitor and notification service are executed on the image capture device.

50. A photo planning and tracking system, comprising:

means for receiving image capture criteria from a user in order for the user to specify an image capture plan, including the setting of goals and notification schedules, the image capture plan including a list of images based on the at least one image capture subject and the constraints;

means for monitoring progress towards the capture of images specified in the image capture plan; and means for issuing electronic notifications of the compliance progress via multiple user-configurable delivery methods, the notifications identifying at least one image from the list of images that has not been captured.

51. A method of tracking image capture compliance with an image capture criteria, the method comprising:

receiving image capture criteria from a user in order for the user to specify an image capture plan, including the setting of goals and notification schedules, the image capture plan including a list of images based on the at least one image capture subject and the constraints;

monitoring progress towards the capture of images specified in the image capture plan; and issuing electronic notifications of the compliance progress via multiple user-configurable delivery methods, the notifications identifying at least one image from the list of images that has not been captured, wherein at least one of the proceeding actions is performed on at least one electronic hardware component.

* * * * *